B. WILSON & F. P. GRIMES.
WIRE FENCE.

No. 109,858.

Patented Dec. 6, 1870.

UNITED STATES PATENT OFFICE

BARTHOLOMEW WILSON AND FRANKLIN P. GRIMES, OF DAYTON, OHIO.

IMPROVEMENT IN WIRE FENCES.

Specification forming part of Letters Patent No. 109,858, dated December 6, 1870.

*To all whom it may concern:*

Be it known that we, BARTHOLOMEW WILSON and FRANKLIN P. GRIMES, of Dayton, in the county of Montgomery, and in the State of Ohio, have invented certain new and useful Improvements in Wire Fences; and do hereby declare that the following is a full, clear, and exact description thereof, reference being had to the accompanying drawings, making part of this specification, in which—

Figure 1:
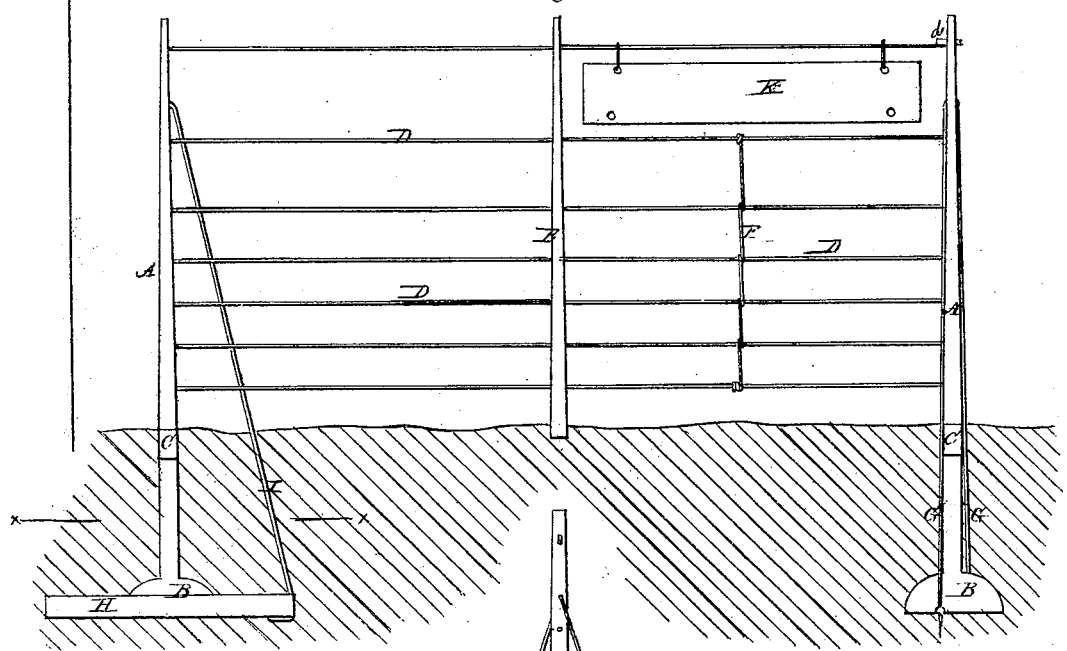
Figure 2:
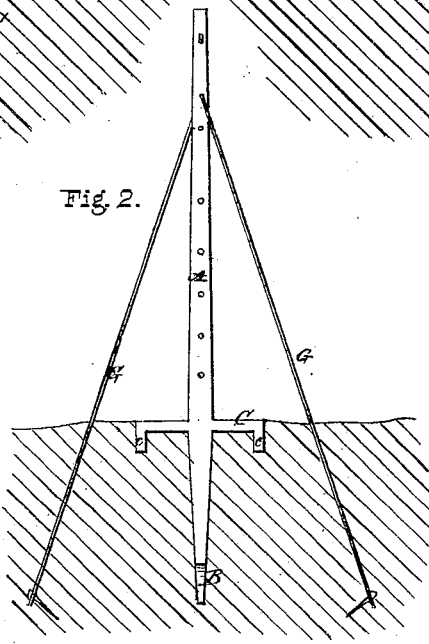
Figure 3:

Figure 1 is a side elevation of a section of our fence. Fig. 2 is an end elevation of the same, and Fig. 3 is a horizontal section of one of the posts on the line $x\ x$ of Fig. 1.

Letters of like name and kind refer to like parts in each of the figures.

The object of our invention is to give increased strength and stability to iron fences, and also to cause them to be plainly seen by cattle, so as to prevent the latter from being injured by coming in contact with the former; and to this end it consists, principally, in the peculiar form and construction of the posts, and in the means employed for securing the same in a vertical position, substantially as is hereinafter set forth.

It also consists in the employment of a narrow strip of board suspended from the upper wire of the fence, substantially as and for the purpose hereinafter shown.

In the annexed drawings, A represents a post, constructed of iron, and provided at its lower end with an anchor, B, having the form shown in Fig. 1, which projects horizontally to either side in a line with the fence.

Projecting horizontally outward from either side of the post A, at the surface of the ground and at a right angle to the line of the fence, is a brace, C, provided at its outer end with an arm, c, that projects vertically downward into the ground, the whole serving to brace said post laterally, and give to it increased bearing-surface upon the ground. The post thus formed is constructed from one piece of iron, the anchor B being drawn out while the braces C are cut from the sides of the post either above or below their point of union therewith, and turned outward to position, making the whole exceedingly rigid and durable, and, at the same time, very cheap.

The posts described are placed in the ground at a suitable distance apart, and connected together by wires D passing through corresponding openings in said posts, where they are secured in place by means of wedges $d$.

For ordinary use each alternate post E may be of the usual kind, and have its lower end embedded but slightly within the ground.

When desired to give increased strength and rigidity to the panels, the wires D may be connected together by means of a wire, F, secured to the upper and lower wires, and wound around those between the same.

For general use in sections where the soil is not very firm it is found advantageous to brace each post laterally by means of a wire, G, passing through its upper end, from whence it extends outward and downward, and has its ends anchored in the ground or secured to suitable posts or stones.

For use upon hill-sides, or in places where more than ordinary rigidity in a line with the fence is required, we employ a sill, H, for receiving the lower end of the post, which sill is placed in a line with the fence, and has one or both of its ends connected with the upper end of said post by means of a wire brace, I.

The wires ordinarily used for fences being so small as to escape the notice of cattle when excited, many are annually injured, and in some instances killed, by running upon such fences, the danger of which adds materially to their expense. To obviate this difficulty we suspend from the upper wire of each panel a narrow strip of board, K, which, being about on a level with the eyes of horses and cattle, as effectually arrests their progress as though the entire fence was constructed of wood.

The especial advantages possessed by this construction of a fence are strength, durability, and efficiency in connection with a comparatively small cost.

Having thus fully set forth the nature and merits of our invention, what we claim as new is—

1. The posts A, provided with the anchors B and with the brace-arm C and c, all constructed from one piece of metal, substantially as and for the purpose specified.

2. The swinging boards K, suspended from and in combination with the panels of a wire fence, substantially as and for the purpose set forth.

In testimony that we claim the foregoing we have hereunto set our hands this 30th day of August, 1870.

BARTHOLOMEW WILSON.
FRANKLIN P. GRIMES.

Witnesses:
DENIS REGAN,
WM. H. SIGMAN.